(12) United States Patent
Muldoon et al.

(10) Patent No.: US 8,383,190 B2
(45) Date of Patent: Feb. 26, 2013

(54) METHOD OF CHEMICAL PROTECTION OF METAL SURFACE

(75) Inventors: John Muldoon, Saline, MI (US);
Monique Richard, Ann Arbor, MI (US);
Kimber L. Stamm, Ann Arbor, MI (US); Emilyne E. Nicolas, Scarborough (CA)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 145 days.

(21) Appl. No.: 12/844,151

(22) Filed: Jul. 27, 2010

(65) Prior Publication Data
US 2011/0104366 A1 May 5, 2011

Related U.S. Application Data

(62) Division of application No. 11/532,945, filed on Sep. 19, 2006, now Pat. No. 7,776,385.

(51) Int. Cl.
*B05D 5/12* (2006.01)
(52) U.S. Cl. .......... 427/58; 429/173; 429/212; 429/245
(58) Field of Classification Search ............ 427/58; 429/173, 212, 245
See application file for complete search history.

(56) References Cited

U.S. PATENT DOCUMENTS

| | | | | |
|---|---|---|---|---|
| 4,327,160 A | * | 4/1982 | Jones et al. | 429/101 |
| 6,841,301 B2 | * | 1/2005 | Heider et al. | 429/199 |
| 6,911,280 B1 | * | 6/2005 | De Jonghe et al. | 429/137 |
| 7,066,971 B1 | * | 6/2006 | Carlson | 29/623.5 |
| 2002/0136957 A1 | | 9/2002 | Zhang et al. | |
| 2006/0019168 A1 | * | 1/2006 | Li et al. | 429/245 |
| 2007/0082268 A1 | * | 4/2007 | Star et al. | 429/246 |

FOREIGN PATENT DOCUMENTS
JP 2000-133272 A 5/2000
JP 2002-319405 A 10/2002

* cited by examiner

*Primary Examiner* — Shamim Ahmed
(74) *Attorney, Agent, or Firm* — Gifford, Krass, Sprinkle, Anderson & Citkowski, P.C.

(57) ABSTRACT

A process for forming a protective layer on a metal surface includes the steps of: providing a metal material having an oxygen containing layer; applying at least two compounds to the oxygen containing layer of the metal material wherein a first compound applied is a molecularly large compound; and applying at least a second compound to the oxygen containing layer of the metal material wherein the second compound is molecularly small.

7 Claims, 5 Drawing Sheets

METHOD OF CHEMICAL PROTECTION OF METAL SURFACE

This is a divisional application of prior application Ser. No. 11/532,945 filed on Sep. 19, 2006 now U.S. Pat. No. 7,776,385.

FIELD OF THE INVENTION

The invention relates to a method of chemical protection of a metal surface.

BACKGROUND OF THE INVENTION

Electrochemical cells containing a metallic anode, a cathode and a solid or solvent-containing electrolyte are known in the art. Such batteries have limitations over repeated charge/discharge cycles and may have drops in their charge and discharge capacity over repeated cycles as compared to their initial charge and discharge capacity. There is therefore a need in the art for an improved method of producing a battery having a high initial capacity and maintains such a capacity on repeated charge and discharge cycles.

Another problem associated with electrochemical cells is the generation of dendrites over repeat charge and discharge cycles. Dendrites may be formed on the anode when the electrochemical cell is charged. The dendrite may grow over repeated cycles and lead to a reduced performance of the battery or a short circuit not allowing the charge and discharge of the battery. There is therefore a need in the art for a method of producing a battery and electrode with an improved cycle life.

SUMMARY OF THE INVENTION(S)

A process for forming a protective layer on a metal surface includes the steps of: providing a metal material having an oxygen containing layer; applying at least two compounds to the oxygen containing layer of the metal material wherein a first compound applied is a molecularly large compound; and applying at least a second compound to the oxygen containing layer of the metal material wherein the second compound is molecularly small.

DETAILED DESCRIPTION OF THE PREFERRED EMBODIMENTS

Figure 1:
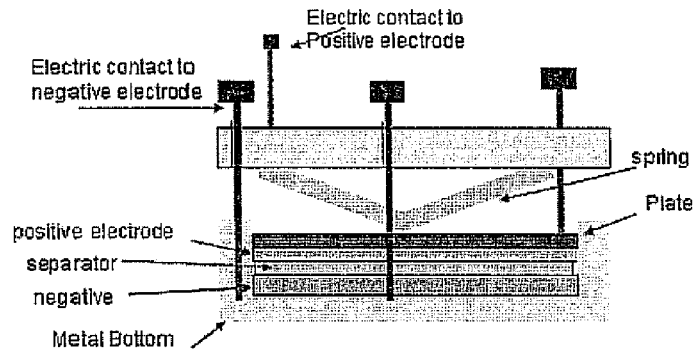
FIG. 1 is a graphical depiction of an experimental setup for impedance testing.

The term electrochemical cell as used herein refers to a device having an anode, cathode and an ion-conducting electrolyte interposed between the two. The electrochemical cell may be a battery, capacitor or other such device. The battery may be of a primary or secondary chemistry. The battery may have a solid electrolyte or a liquid electrolyte. The term anode as used herein refers to an electrode, which oxidizes during a discharge cycle.

There is disclosed an electrochemical cell having an anode including a metal material having an oxygen containing layer. The anode metal material may be alkaline metals or alkaline earth metals as indicated in the periodic table. Non-limiting examples of metal materials include: lithium, aluminum, sodium, and magnesium. In a preferred aspect of the invention the metal material is lithium.

The oxygen containing layer may be formed by exposing the metal material to the atmosphere or may otherwise be formed on the metal material. The electrochemical cell also includes a cathode, which may be formed of any suitable material. An electrolyte is interposed between the anode and cathode and may be of any suitable form including solid electrolytes liquid electrolytes and gel polymer electrolytes, which are a polymer matrix swollen with solvent and salt. Solid electrolytes could be polymer-type, inorganic layer or mixtures of these two. Examples of polymer electrolytes include, PEO-based, and PEG based polymers. Inorganic electrolytes could be composed of sulfide glasses, phosphide glasses, oxide glasses and mixtures thereof. An example of a liquid electrolyte includes carbonate solvent with dissolved metal-ion salt, for example 1M $LiPF_6$ in ethylene carbon/diethyl carbonate (EC/DEC).

The anode of the electrochemical cell includes a chemically bonded protective layer formed thereon by reacting a D or P block precursor with the oxygen containing layer. The term D or P block precursor includes compounds that have elements in the D or P block of the periodic table. Examples of D or P block elements include phosphorus, boron, silicon, titanium, molybdenum, tantalum, vanadium to name a few. The D or P block precursor may be an organo-metallic compound. Examples of organo-metallic compounds include: inter-metallic compounds, alloys and metals having organic substituents bonded thereon. In a preferred aspect of the invention D or P block precursors may include silicon, boron or phosphorous. The D or P block precursors react with the oxygen containing layer of the metal material to form the protective layer.

In one embodiment, the D or P block precursor may contain a halogen functionality. The precursor may be a chemical compound of the formula: $AR^1R^2X$ wherein A is selected from phosphorous or boron, X is a halogen or halogen containing compound and $R^1$ is selected from halogens, alkyl groups having from 1 to 20 carbons, alkoxy groups containing 1 to 20 carbons, or aromatic groups having from 1 to 20 carbons, $R^1$ is selected from halogens, alkyl groups having from 1 to 20 carbons, alkoxy groups containing 1 to 20 carbons, or aromatic groups having from 1 to 20 carbons.

The halogen may be chlorine, bromine, fluorine, and iodine. The alkyl, alkoxy, and aromatic groups may be fluorinated or partially fluorinated.

The alkyl group may be methyl, ethyl, n-propyl, isopropyl, n-butyl, isobutyl, sec-butyl, tert-butyl, tert-pentyl, iso-octyl, tert-octyl, 2-ethyhexyl, nonyl, decyl, undecyl, cyclopentyl, cyclohexyl, cycloheptyl, cyclooctyl, 1-methylcyclopentyl, 1-methylcyclohexyl, 1-methylcyclohexyl, and 1-methyl-4-isopropylcyclohexyl, although other alkyl groups not listed may be used by the invention. The alkyl group may also be functionalized. Suitable functional groups include: ether, sulfide, sulfoxide.

The aromatic group may be phenyl groups, phenyl groups having alkyl substituents in the para, meta or ortho position, and polyaromatic compounds. Non-limiting examples of suitable polyaromatic compounds include naphthalene derivatives.

In another embodiment of the invention, the D or P block precursor may be a chemical compound of the formula: $AR^1R^2R^3R^4X$ wherein A is phosphorous, X is a halogen or halogen containing compound and $R^1$ is selected from halogens, alkyl groups having from 1 to 20 carbons, alkoxy groups containing 1 to 20 carbons, aromatic groups having from 1 to 20 carbons, or oxygen $R^2$ is selected from halogens, alkyl groups having from 1 to 20 carbons, alkoxy groups containing 1 to 20 carbons, aromatic groups having from 1 to 20 carbons, or oxygen, $R^3$ is selected from halogens, alkyl groups having from 1 to 20 carbons, alkoxy groups containing 1 to 20 carbons, aromatic groups having from 1 to 20 carbons, or oxygen, $R^4$ is selected from halogens, alkyl groups having from 1 to 20 carbons, alkoxy groups containing 1 to 20 carbons, aromatic groups having from 1 to 20 carbons, or oxygen.

In the case where the compound includes double bonded oxygen or other double bonded substituent, the number of R groups may be less than four total.

As with the previously described embodiment, the description of the halogens, alkyl, alkoxy and aromatic groups are the same and are not repeated.

In another embodiment of the invention, the D or P block precursor may be a chemical compound of the formula: $SiR^1R^2R^3X$ wherein, X is a halogen or halogen containing compound and $R^1$ is selected from hydrogen, halogens, alkyl groups having from 1 to 20 carbons, alkoxy groups containing 1 to 20 carbons, or aromatic groups having from 1 to 20 carbons, $R^2$ is selected from hydrogen, halogens, alkyl groups having from 1 to 20 carbons, alkoxy groups containing 1 to 20 carbons, or aromatic groups having from 1 to 20 carbons $R^3$ is selected from hydrogen, halogens, alkyl groups having from 1 to 20 carbons, alkoxy groups containing 1 to 20 carbons, or aromatic groups having from 1 to 20 carbons.

As with the previously described embodiments, the description of the halogens, alkyl, alkoxy and aromatic groups are the same and are not repeated.

The process for protecting a metal surface having an oxygen containing layer includes applying at least two compounds to the oxygen containing layer of the metal material. The process may include a plurality of compounds being applied to the oxygen containing layer of the metal surface or it may include two compounds, as will be described in more detail below. When a plurality of compounds is applied to the oxygen containing layer of the metal material, the first of the plurality of compounds is molecularly large and subsequently applied compounds are molecularly small. In another aspect, each of the plurality of compounds may be molecularly smaller than a preceding applied compound.

When two compounds are applied to the oxygen containing layer of the metal material, the first compound applied is a molecularly large compound; and a second compound is molecularly small. In one aspect, the second compound has a steric hindrance less than the first compound.

The at least two compounds may be D or P block precursors as outlined above. In one aspect, the first compound may be a molecularly large compound. The molecularly large compound may have from 7 to 20 carbons. The second compound may be a molecularly small compound having from 1 to 10 carbons and in one aspect from 1 to 6 carbons. The combination of a larger compound application followed by a smaller compound application allows for a dense coverage of the surface area of the metal material to be protected providing a more uniform solid electrolyte interface. The first and second compounds may have the same D or P block elements or may have different D or P block elements. In one aspect, at least one of the compounds may increase the hydrophobicity of the resulting solid electrolyte interface.

The first and second compounds may be applied as a liquid or vapor to the metal having the oxygen containing layer. When applied as a liquid, the first compound may be applied by dipping, spraying, coating or otherwise applying the liquid to the surface of the metal and allowing the first compound to react with the oxygen containing layer. The first compound may then be dried before applying the second compound and allowing it to react with the oxygen containing layer. Additionally, any suitable vapor deposition technique may also be utilized. For example, the metal may be placed in a container that contains the vaporized first compound. The vapor surrounds the metal reacting with the oxygen containing layer. The second compound may also be similarly applied. Various pressures and temperatures may be used based upon the properties of the first and second compounds.

EXAMPLES

In the experiments detailed in the examples section, lithium metal strips were exposed to various first and second compounds, as listed in Table 1. Various combinations of the first and second compounds were utilized as detailed in the following examples and as shown in the following referenced figures. The lithium strips were placed in a sealed flask at room temperature in an inert atmosphere containing the first or second compounds. The strips were exposed to the first then a second compound a suitable period of time for the first and second compounds to react with the metal oxygen containing layer on the lithium to form the protective layer. Various analysis procedures were performed including impedance tests to determine the resistance of the various samples.

TABLE 1

| Chemical Name | Molecule Type<br>Small = 1-6 Carbons<br>Large = 7-20 Carbons | Structure |
| --- | --- | --- |
| Chlorotrimethylsilane (CTMS) | Small | $\text{H}_3\text{C}-\underset{\underset{\text{CH}_3}{|}}{\overset{\overset{\text{Cl}}{|}}{\text{Si}}}-\text{CH}_3$ |

TABLE 1-continued

| Chemical Name | Molecule Type<br>Small = 1-6 Carbons<br>Large = 7-20 Carbons | Structure |
|---|---|---|
| Chlorodimethylphenethylsilane (CDMPS) | Large | C₆H₅—CH₂CH₂—Si(CH₃)₂—Cl |
| Chlorodiethylphosphine (CDEP) | Small | (CH₃CH₂)₂P—Cl |
| Chlorodiisopropylphosphine (CDIPP) | Small | ((CH₃)₂CH)₂P—Cl |
| P-Chlorodiphenylphosphine (PCDPP) | Large | (C₆H₅)₂P—Cl |
| Bromodimethylborane (BDMB) | Small | CH₃—B(Br)—CH₃ |

Example 1

Figure 2:
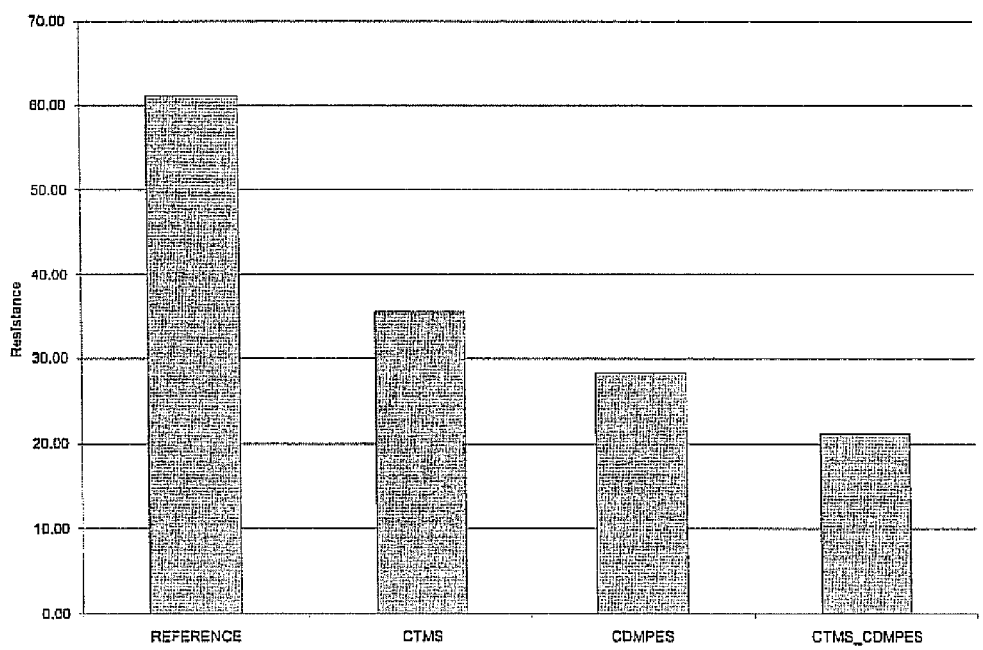
FIG. 2 is a plot of the resistance for various silicon containing precursors applied to a metal surface.

An untreated sample of the lithium metal and samples treated with chlorotrimethyl silane, chlorodimethylphenethyl silane and a sample treated with a first compound of chlorodimethylphenethyl silane followed by a second compound of chlorotrimethyl silane, according to the above procedure were analyzed using impedance testing to provide a resistance. Impedance tests were performed on the various treated samples of lithium and untreated lithium as a reference. The experimental setup used is shown in FIG. 1. The various samples were formed using the procedure described above. The lithium samples were tested in the experimental setup with the sample placed in the positive electrode position. The impedance values were used to calculate a resistance of the various samples, which are displayed in FIG. 2 for the various samples. As can be seen in FIG. 2, the resistance for all the treated samples is less than the untreated reference. However the lowest resistance is achieved with the sample that was formed using a two step process of applying a first molecularly large compound followed by a second molecularly small compound. A lower resistance metal material is desirable for use as an electrode in an electrochemical cell.

Example 2

Figure 3:
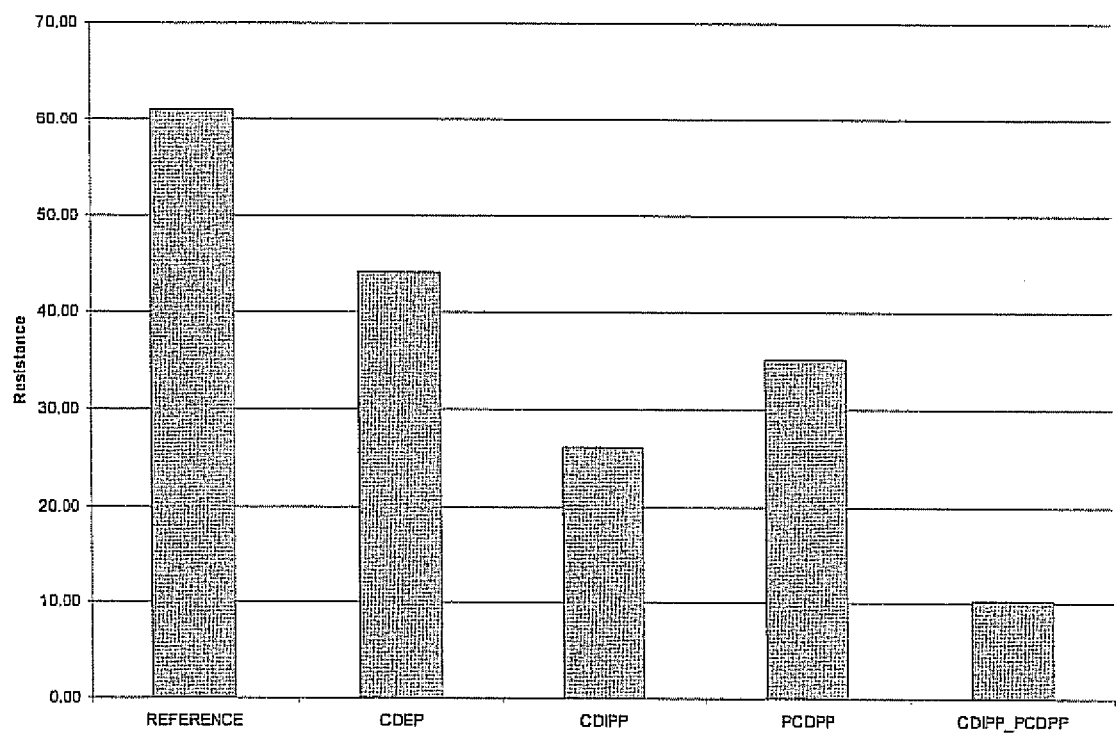
FIG. 3 is a plot of the resistance for various phosphorous containing precursors applied to a metal surface.
Figure 4:
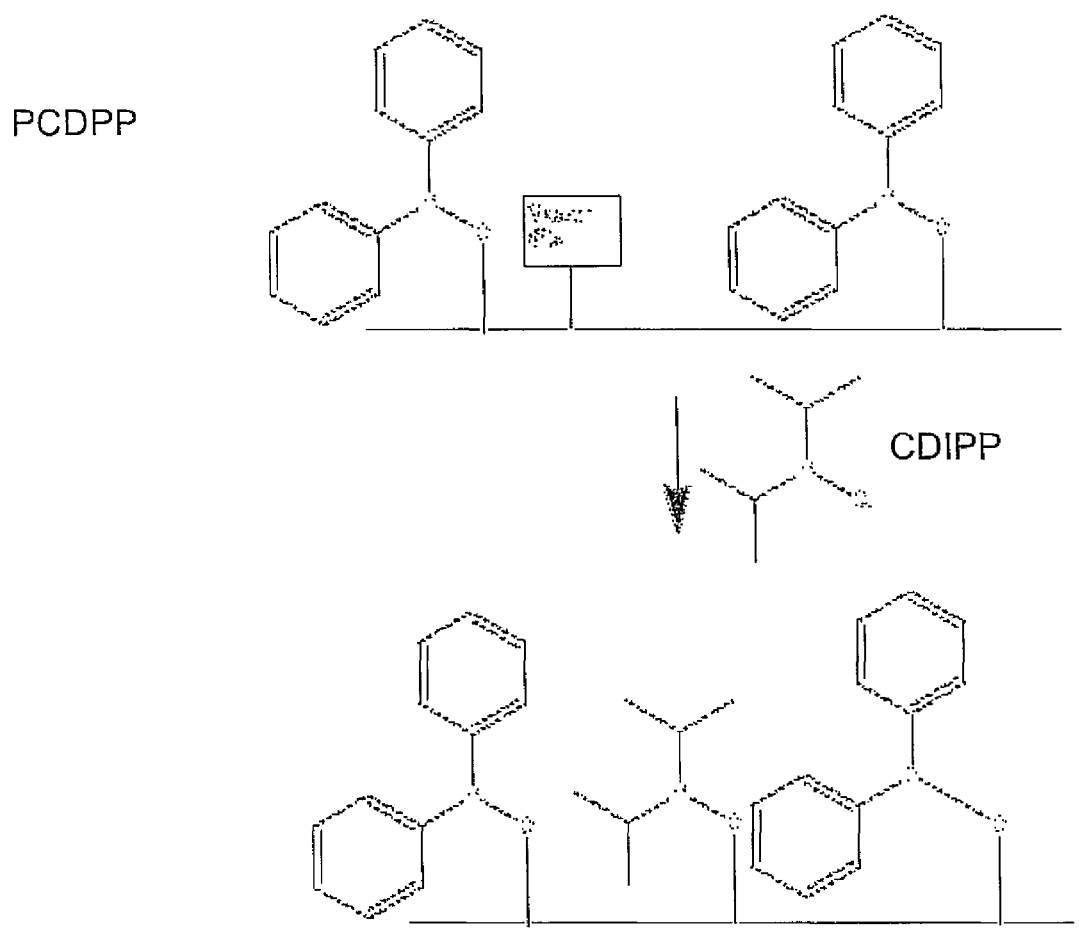
FIG. 4 is a graphical depiction of a two step process of applying a first molecularly large compound and then applying a second molecularly small compound.

A similar experiment to that of example one was performed using first and second compounds having phosphorous based precursors including: chlorodiethylphosphine (CDEP), chlorordiisopropylphosphine(CDIPP), P-chlorodiphenylphosphine (PCDPP), and dimethylphosphinic chloride (DMPC). As with the previously described example, the samples were formed using the above described procedure and were subjected to impedance testing to generate resistance values displayed in FIG. 3. As with the previous examples all of the treated samples had a lower resistance than the reference. The lowest resistance was achieved in the sample prepared with a two step process of applying a first compound of PCDPP followed by a second compound of CDIPP. A graphical depiction of the sample prepared using the two step process is shown in FIG. 4. It can be seen that a surface coverage of the two compounds is greater than the molecularly large compound alone. The molecularly large PCDPP fills a portion of the surface, while the molecularly small compound fills another portion of the surface that can not be covered by the large molecular compound alone. In this manner a greater surface area may be covered

Example 3

Figure 5:
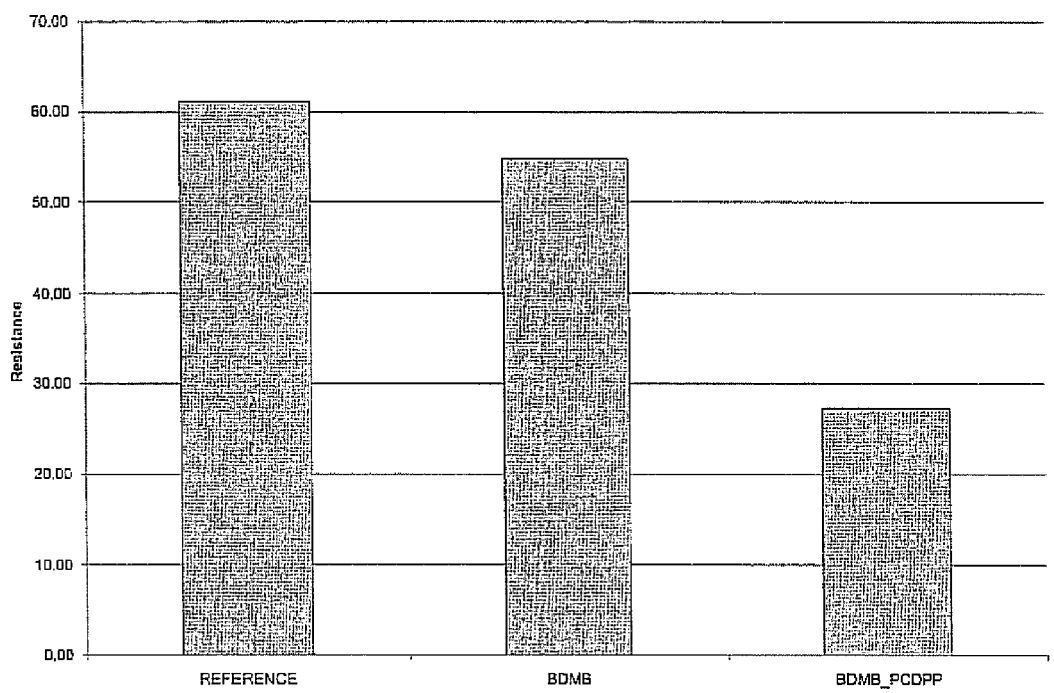
FIG. 5 is a plot of the resistance for various boron containing precursors applied to a metal surface.

A similar experiment to that of the previous examples was performed using a first compound having a boron based precursor, including: bromodimethylborane (BDMB), and a second compound having D or P block based precursors including P-chlor diphenylphosphine (PCDPP). As with the previously described examples, the samples were formed using the above described procedure and were subjected to impedance testing to generate resistance values displayed in FIG. 5. As with the previous examples all of the treated samples had a lower resistance than the reference. The lowest resistance was achieved in the sample prepared with a two step process of applying a first compound of PCDPP followed by a second compound of BDMB.

Figure 6:
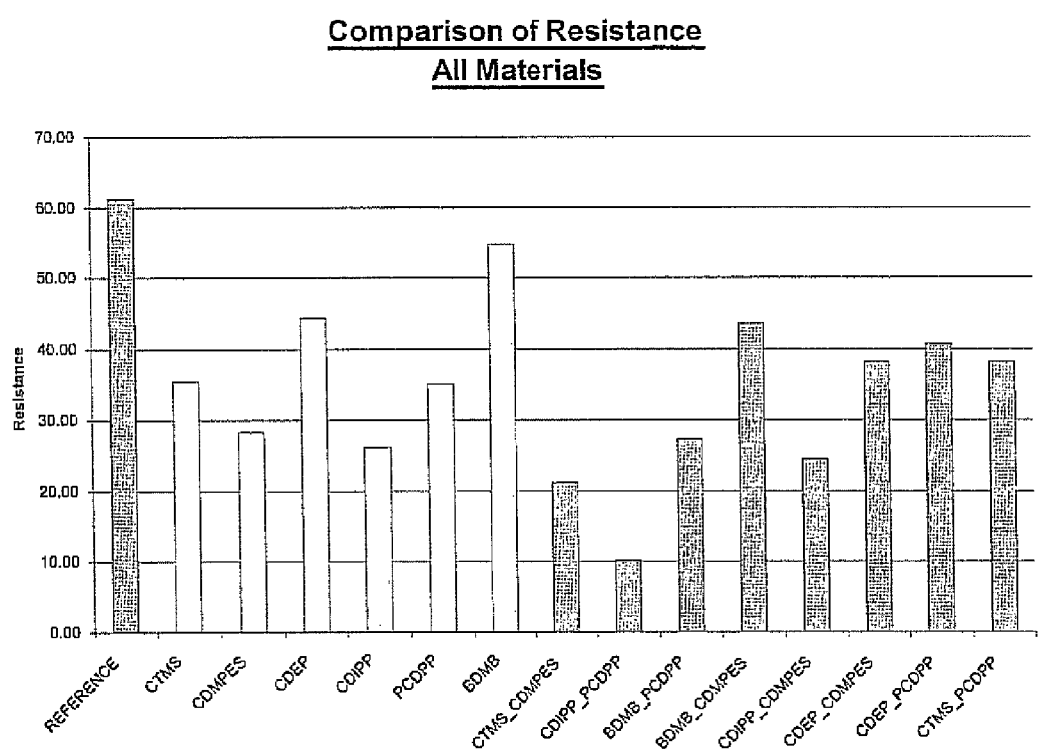
FIG. 6 is a plot of the resistance for various samples using a process of applying a first molecularly large compound and then applying a second molecularly small compound.

Various combinations of the samples were prepared for the materials listed in Table according to the above referenced procedures and testing protocols. The various resistances of the materials are displayed in FIG. 6. As can be seen from FIG. 6, all of the treated samples had a lower resistance than the reference. The samples treated with a two step process of applying a first molecularly large compound and then a second molecularly small compound produced the lowest resistance values. Additionally of the samples formed using a two step process, those having the same D or P block element displayed the lowest resistance values.

The invention has been described in an illustrative manner. It is to be understood that the terminology, which has been used, is intended to be in the nature of words of description rather than limitation. Many modifications and variations of the invention are possible in light of the above teachings. Therefore, within the scope of the appended claims, the invention may be practiced other than as specifically described.

The invention claimed is:

1. A process for protecting a metal surface comprising the steps of:
   providing a metal material having an oxygen containing layer;
   applying at least two D or P block precursors to the oxygen containing layer of the metal material wherein a first compound applied is a molecularly large compound having from 7 to 20 carbons; and the at least second compound is a molecularly small compound having from 1 to 6 carbons wherein the at least two compounds react with the oxygen containing layer forming a protective layer wherein the D or P block precursor includes a chemical compound of the formula: $SiR^1R^2R^3X$ wherein, X is a halogen or halogen containing compound and $R^1$ is selected from hydrogen, halogens independent of the X group, alkyl groups having from 1 to 20 carbons, alkoxy groups containing 1 to 20 carbons, or aromatic groups having from 1 to 20 carbons, $R^2$ is selected from hydrogen, halogens independent of the X group, alkyl groups having from 1 to 20 carbons, alkoxy groups containing 1 to 20 carbons, or aromatic groups having from 1 to 20 carbons $R^3$ is selected from hydrogen, halogens independent of the X group, alkyl groups having from 1 to 20 carbons, alkoxy groups containing 1 to 20 carbons, or aromatic groups having from 1 to 20 carbons.

2. The process of claim 1 wherein the halogen of X, $R_1$, $R_2$, or $R_3$ is selected from chlorine, bromine, fluorine, and iodine.

3. The process of claim 1 wherein the alkyl, alkoxy, and aromatic groups may be fluorinated or partially fluorinated.

4. The process of claim 1 wherein the alkyl group is functionalized.

5. The process of claim 1 wherein the alkyl group is selected from methyl, ethyl, n-propyl, isopropyl, n-butyl, isobutyl, sec-butyl, tert-butyl, tert-pentyl, iso-octyl, tert-octyl, 2-ethyhexyl, nonyl, decyl, undecyl, cyclopentyl, cyclohexyl, cycloheptyl, cyclooctyl, 1-methylcyclopentyl, 1-methylcyclohexyl, 1-methylcyclohexyl, and 1-methyl-4-isopropylcyclohexyl.

6. The process of claim 1 wherein the alkyl and alkoxy groups are cyclic.

7. The process of claim 1 wherein the second of the at least two compounds has a steric hindrance less than the first compound.

* * * * *